May 29, 1951 — G. WISECARVER — 2,554,653
ADJUSTABLE CRUTCH
Filed July 14, 1948
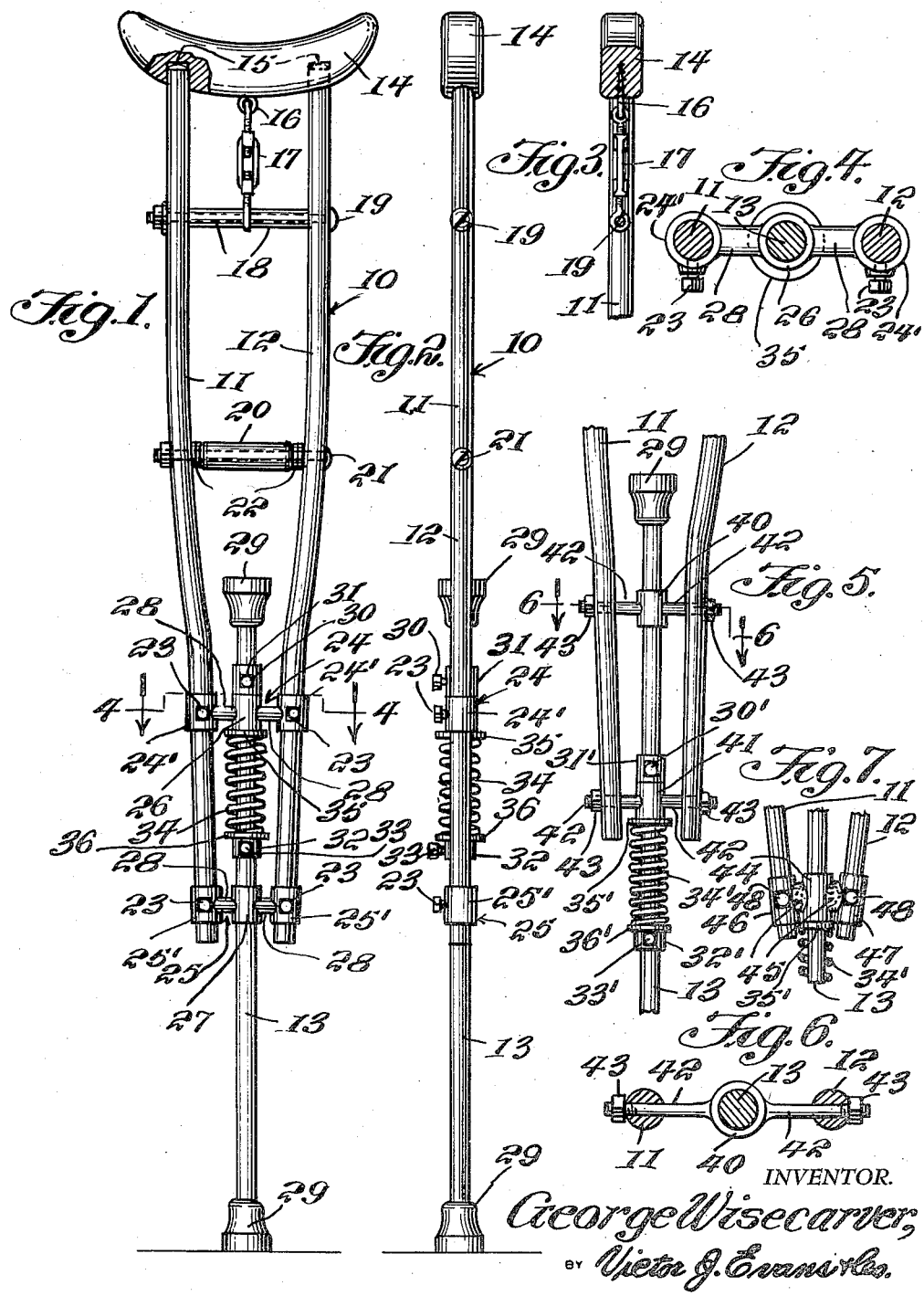
INVENTOR.
George Wisecarver,
BY Victor J. Evans & Co.
ATTORNEYS Patented May 29, 1951

2,554,653

UNITED STATES PATENT OFFICE 2,554,653

ADJUSTABLE CRUTCH

George Wisecarver, Pikeville, Ky.

Application July 14, 1948, Serial No. 38,580

1 Claim. (Cl. 135—53)

This invention relates to crutches, and more particularly to an improved flexible or shock absorbing crutch.

An object of this invention is to provide a crutch having a shock absorbing means between the ground contacting part and the armpit engaging part, and the armpit engaging part is connected to the crutch so that it can be removed or retained in portion as desired.

The crutch can be adjusted through the shock absorbing means to compensate for the weight of the person using the crutch so that the right tension can be maintained by the shock absorbing means.

The crutch embodying the invention will be made of aluminum, making it light, easy and comfortable to use, and durable. The crutch will have more resiliency than the ordinary type crutch, and will be attractive in appearance.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention;

Figure 2 is a side or edge view of Figure 1;

Figure 3 is a detailed sectional fragmentary view of the arm support of the crutch;

Figure 4 is a cross sectional view on the line 4—4 of Figure 1;

Figure 5 is a fragmentary view of a modified form of the invention;

Figure 6 is a cross sectional view on the line 6—6 of Figure 5; and

Figure 7 is a modified form of securing means for the crutch, partly in section.

Referring more in detail to the drawing, the crutch embodying the invention is generally designated by the reference numeral 10.

The crutch 10 comprises the side arms 11 and 12 respectively, which extend in spaced relation to each other throughout their entire length, but converge inwardly at their lower ends to receive the staff or leg 13. It is conventional to provide an arm support for the upper end of a crutch, and this invention contemplates an arm rest 14 having a unique method of attaching it to the upper ends of the arms 11 and 12. The arm rest 14 is provided with spaced sockets 15 on its under surface to receive the upper ends of the arms 11 and 12. Secured to the arm rest 14, centrally and intermediately of the sockets 15, is a screw eye 16 which engages one end of a turnbuckle 17.

The other end of the turnbuckle 17 is connected to a bolt 19 passing through the arms 10 and 11. The tubular members 18 are sleeved on the bolt 19 on opposite sides of the end of the turnbuckle 17 and intermediate of the arms 10 and 11 and the end of the turnbuckle 17. The bolt 19 will fix the arm rest 14 in its proper position.

Thus if the turnbuckle 17 is disconnected, the arm rest 14 may be removed for replacement or repair, but once the turnbuckle is connected the arm rest will be positively retained in position on the upper ends of the arms 11 and 12.

A tubular hand grip 20 is fixed to the side arms 11 and 12 at a convenient location below the arm rest 14 in parallel relation to the arm rest. The hand grip is fixed by means of a bolt 21 which passes through the grip and both arms, and is secured in place in the conventional manner. Washers 22 sleeved on the bolt 21 intermediate the ends of the grip 20, and the arms, properly space the grip from the arms for the convenience of the user of the crutch.

Below the hand grip, there is secured to the side arms, by bolts 23, the upper and lower coupling members 24 and 25 respectively. The member 24 comprises a central sleeve portion 26 and the member 25 comprises the central sleeve portion 27 and each sleeve portion is spaced from the sleeve portions 24' and 25' respectively of the members 24 and 25 in the same horizontal plane by means of studs 28.

The sleeve portions 26 and 27 of each of the members 24 and 25 are sleeved on the staff or leg 13 and each end of the staff or leg 13 is provided with a crutch tip 29. The crutch tip 29 on the upper end of the staff or leg serving as a spare, should the tip engaging the ground be lost or damaged.

Fixed to the staff or leg 13 above the portion 26 of the member 24 by a bolt 30 is the sleeve 31, while a similar sleeve 32 is fixed to the staff or leg 13 below the portion 26 by a bolt 33. Interposed on the staff or leg 13 intermediate of the portion 26 and the sleeve 32 is a shock absorbing coil spring 34 which abuts at its top and bottom coils the washers 35 and 36 respectively.

The crutch thus described will provide a compact structure that will, through the use of the sliding staff or leg 13 tensioned by the spring 34, provide a shock absorbing structure that is very flexible in use. The movement of the sleeves 31 and 32 increasing or decreasing the tension of the spring 34.

In Figure 5, sleeves 40 and 41, are fixed to the side arms 11 and 12 respecively by means of bolts 42 formed integral with the sleeves and extending in opposite directions therefrom in the same horizontal plane, nuts 43 on the ends of the bolts fixing the sleeves in position. In this form of the invention the staff or leg 13 is slidably received in the sleeves 40 and 41 and a sleeve 31' is fixed to the staff or leg 13 above the sleeve 41 by a bolt 30', a similar sleeve 32' is fixed to the staff or leg 13 below the collar 41 by a bolt 33'.

Interposed on the staff or leg 13 intermediate of the sleeve 41 and the sleeve 32' is a shock absorbing spring 34' which abuts at its tip and bottom coils the washers 35' and 36' respectively. Except for its manner of mounting, the manner of operation of this form of the invention is exactly similar to the form previously described.

In Fig. 7, the central sleeve 44 is brazed, as at 45, to the outer sleeves 46 and 47 respectively and the outer sleeves are fixed to the arms 11 and 12 by bolt 48. This form of the invention may be mounted in lieu of the sleeve 41 and its component parts as shown in Fig. 5 or it may be mounted in lieu of the sleeve portion 27 as shown in Fig. 1. This form may also be used in lieu of sleeve 40 and its component parts or sleeve portion 26 and its component parts. Thus the forms are interchangeable as desired according to the various methods of manufacture.

It is believed that the construction and use of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A crutch of the character described, comprising side arm members spaced from each other for their entire length, a hand grip secured intermediate of said side arm members, coupling means detachably carried by said side arm members below said hand grip, said coupling means comprising upper and lower sleeve members, means extending from said sleeve members at right angles thereto on opposite sides thereof adapted to be detachably connected to said side arm members, a leg slidably mounted in the sleeve members of said coupling means intermediate of said side arm members, a shock absorbing spring on said leg and means coacting with said couplings means and said spring to tension said leg, said last means comprising a collar detachably connected to said leg between said sleeve members and in engagement with the lower end of said spring, a second collar on said leg engaging the upper edge of said upper sleeve to limit the outward movement of said leg with respect to said coupling means, and an arm support fixed to the upper ends of said side arm members.

GEORGE WISECARVER.

REFERENCES CITED

The following references are of record in the file of this patent:

UNITED STATES PATENTS

| Number | Name | Date |
| --- | --- | --- |
| 1,035,760 | Walton | Aug. 13, 1912 |
| 1,265,993 | Bonds | May 14, 1918 |
| 1,349,639 | Taylor et al. | Aug. 17, 1920 |
| 1,499,458 | Hughes | July 1, 1924 |